(12) United States Patent  
Chrupalla

(10) Patent No.: US 9,138,666 B2
(45) Date of Patent: Sep. 22, 2015

(54) FILTER WITH AUTOMATIC DECLOGGING

(75) Inventor: Jean-Claude Chrupalla, Vaureal (FR)

(73) Assignee: ALFA LAVAL MOATTI, Elancourt (FR)

( * ) Notice: Subject to any disclaimer, the term of this patent is extended or adjusted under 35 U.S.C. 154(b) by 315 days.

(21) Appl. No.: 13/820,353

(22) PCT Filed: Aug. 31, 2011

(86) PCT No.: PCT/FR2011/051991
§ 371 (c)(1),
(2), (4) Date: Mar. 1, 2013

(87) PCT Pub. No.: WO2012/028824
PCT Pub. Date: Mar. 8, 2012

(65) Prior Publication Data
US 2013/0161252 A1    Jun. 27, 2013

(30) Foreign Application Priority Data
Sep. 3, 2010 (FR) ...................................... 10 57029

(51) Int. Cl.
*B01D 25/26* (2006.01)
*B01D 29/68* (2006.01)

(52) U.S. Cl.
CPC .............. *B01D 25/26* (2013.01); *B01D 29/682* (2013.01)

(58) Field of Classification Search
None
See application file for complete search history.

(56) References Cited

U.S. PATENT DOCUMENTS

| 4,481,111 A | 11/1984 | Christophe et al. |
| 4,592,838 A | 6/1986 | Christophe et al. |
| 4,601,826 A | 7/1986 | Christophe et al. |
| 2003/0089657 A1 | 5/2003 | Drori |

FOREIGN PATENT DOCUMENTS

| CH | 386989 | 1/1965 |
| FR | 2779359 A1 | 12/1999 |
| FR | 2902024 A1 | 12/2007 |
| JP | 59136112 A | 8/1984 |
| JP | 60106509 A | 6/1985 |
| JP | 60118208 A | 6/1985 |
| JP | 195210 U | 6/1989 |
| JP | 2002517305 A | 6/2002 |

*Primary Examiner* — Benjamin Kurtz
(74) *Attorney, Agent, or Firm* — Birch, Stewart, Kolasch & Birch, LLP

(57) ABSTRACT

Disclosed is an arrangement of distribution columns that can be used to discharge the declogging fluid from a filter with automatic declogging or backwashing. A stationary divider is arranged coaxially in a stack of filter elements and has distinct ducts, e.g. embodied by fins, the ducts establishing communication between a rotary distributor and groups of passages in the stack that are in alignment along generator lines of the stack.

13 Claims, 7 Drawing Sheets

FILTER WITH AUTOMATIC DECLOGGING

BACKGROUND OF THE INVENTION

1. Field of the Invention

The invention relates to a filter with automatic backwashing of the type having at least one pair of filter elements that are essentially annular and flat, each having a screen, and that are stacked along an axis. More particularly, the invention relates to the arrangement of means for automatically backwashing said screens.

2. Description of Related Art

The French patent published under the number 2 779 359 describes a filter structure using annular flat filter elements, each having an "internal" face, an "external" face, and a screen. The screen is annular and extends between two concentric circular margins, respectively an inner margin and an outer margin. Radial ribs that are regularly distributed circumferentially and that extend facing one another on opposite sides of the screen between said concentric margins serve to form sectors on the internal face and on the external face. Such filter elements are designed to be assembled against each other in such a manner that their facing internal faces define a space that is compartmented radially by the contacting radial ribs of said internal faces. For each sector, passages are arranged in the inner and outer margins. By stacking a selected number of filter element pairs, a desired filter area is obtained for an intended application. Typically, the fluid for filtering penetrates into the stack via passages situated radially on the inside, passes through the screens, and, once purified, penetrates into the various above-defined spaces to exit via the passages defined radially on the outside. Naturally, the flow of fluid between the screens could be reversed or arranged in some other way.

In that known prior art device, backwashing is used to unclog the filter by making use of the clean fluid that is available under pressure at the outlet from the filter. For example, a distributor is mounted axially inside the stack and is driven in rotation. It has a longitudinal opening suitable for coming into communication with all of the passages defined in the inner margins along a given generator line of the annular stack. The distributor is in communication with an exhaust outlet for the fluid carrying the impurities resulting from backwashing, sector by sector. During rotation of the distributor, the sectors are isolated one after another and no longer receive fluid for cleaning. On the contrary, a fraction of the fluid that has just been cleaned penetrates as a backwash into the isolated sector (which extends over the full height of the stack) and serves to unclog the portions of the screen that are defined by the sectors.

The fluid conveying the impurities that result from the backwashing can be processed by a second filter stage or by a centrifuge system. Periodic purges serve to clear the system of these impurities.

The above-described filter structure requires a rotary distributor that extends axially over the entire length of the stack of filter elements. Its length therefore depends on the size of the filter, which is an obstacle to reducing the cost price of such a filter.

Document FR 2 902 024 proposes another type of rotary distributor by associating each filter element with segments of longitudinal channels adjacent to one of said inner or outer margins and communicating respectively with the passages therein.

The stack of filter elements thus defines a set of parallel distribution columns extending circumferentially side by side along directions that are parallel to the axis of said stack. A rotary backwash distributor is mounted to rotate at one end of the stack so that its opening is periodically and selectively put into communication with each of the distribution columns.

That solution gives satisfaction for filter elements of small size. Nevertheless, as is known, such a filter element includes radial and circumferential ribs molded onto a filter screen. The channel segment needs to be made during the same operation. When making filter elements of large size, it has been found that it is difficult to inject the material constituting these ribs and the associated channel segments.

The invention serves in particular to solve that problem.

SUMMARY OF THE INVENTION

More particularly, the invention provides a filter comprising at least one pair of flat filter elements, each having an "internal" face, an "external" face, a screen, two concentric circular margins, respectively an inner margin and an outer margin between which said screen extends, and radial ribs regularly distributed circumferentially and extending facing one another on either side of said screen and between said concentric margins in order to form sectors on said internal face and on said external face, said two filter elements being assembled one against the other so that said facing internal faces define a space that is radially compartmented by the contacting radial ribs of said internal faces, said outer and inner margins having respective passages communicating with corresponding ones of the sectors, the filter also comprising parallel distribution columns extending along an axial direction, and a rotary backwashing distributor having an opening, said distributor being mounted to rotate so that said opening is periodically and selectively put into communication with each distribution column, the filter being characterized in that said distribution columns are embodied by a stationary divider arranged coaxially with a stack of filter elements of said filter, the divider having distinct ducts respectively establishing communication between said rotary distributor and groups of the above-mentioned passages of said stack that are in alignment along generator lines of the stack.

Advantageously, said ducts are embodied by fins that are regularly distributed circumferentially and that extend in planes containing a longitudinal axis of said filter.

The number of fins is equal to the number of radial ribs in such a filter element.

The filter element is of conventional structure, i.e. it does not have the above-described channel segments, and it is therefore easier to fabricate, in particular by injecting material from the center. This also significantly reduces the length of the surfaces providing sealing between the channels, thereby significantly reducing leaks.

In an embodiment, said divider is arranged inside the stack of disks constituting the filter elements, i.e. such filter elements, united in pairs, are assembled around the divider.

More particularly, the filter of the invention is advantageously characterized in that said divider is constituted by the above-mentioned fins attached to an axial cylindrical core, the edges of said fins being in contact with the inner cylindrical surface of said stack of filter elements in such a manner that each distribution column is defined by two adjacent fins and by the inner surface of the stack, and communicates with the passages in the inner margins of said external faces of the filter elements extending along a common direction parallel to said longitudinal axis.

Advantageously, the filter is also characterized in that each free edge of a fin includes a strip extending longitudinally and presenting a cylindrical outer surface having a radius of curvature identical to that of the inner cylindrical surface of said stack, and against which it bears.

It should be observed that the finned divider as defined is a part that is easy to make. It is a section member of constant profile that can be obtained in great length, e.g. by extrusion. This reduces costs considerably. The length of the divider may be adjusted as a function of the length of the filter merely by cutting off a segment with the appropriate length from such a section member.

Advantageously, the distributor is driven by a hydraulic motor. The hydraulic motor may be powered by the filtered fluid itself.

According to another advantageous characteristic, the filter is characterized in that the pair(s) of axially stacked filter elements is/are clamped between a cover and a distribution spacer, in that said distribution spacer has passages extending said distribution columns and opening out into an annular surface thereof, and in that said rotary distributor has an exhaust channel connected to said opening, which opening is defined in a surface of said distributor in sealing and sliding contact with said annular surface of said distribution spacer into which said passages open out.

The opening is situated between two shutter portions of said surface of said distributor. This makes it possible to isolate a portion of the filter before it is backwashed while the adjacent portion is being backwashed. This avoids any mixing between clean fluid and backwash fluid.

BRIEF DESCRIPTION OF THE DRAWINGS

The invention can be better understood and other advantages thereof appear more clearly in the light of the following description given purely by way of example and made with reference to the accompanying drawings, in which.

DETAILED DESCRIPTION OF THE INVENTION

Figure 1:
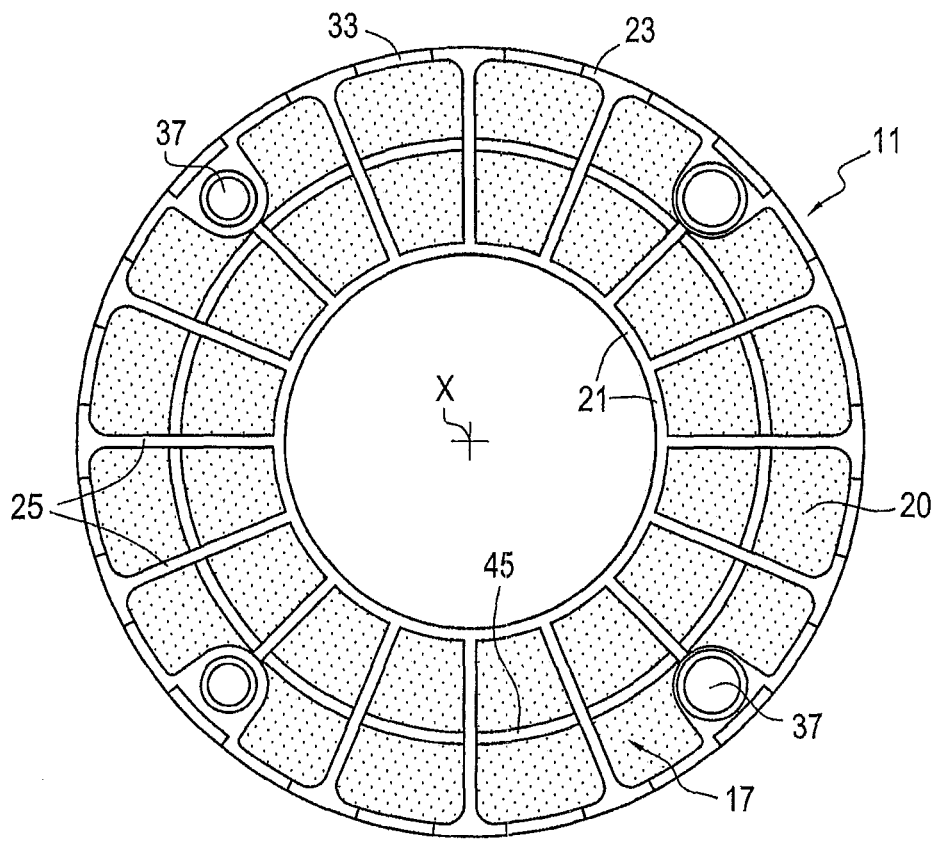
FIG. 1 is a plan view of the "internal" face of a filter element used in making a filter in accordance with the invention.
Figure 2:
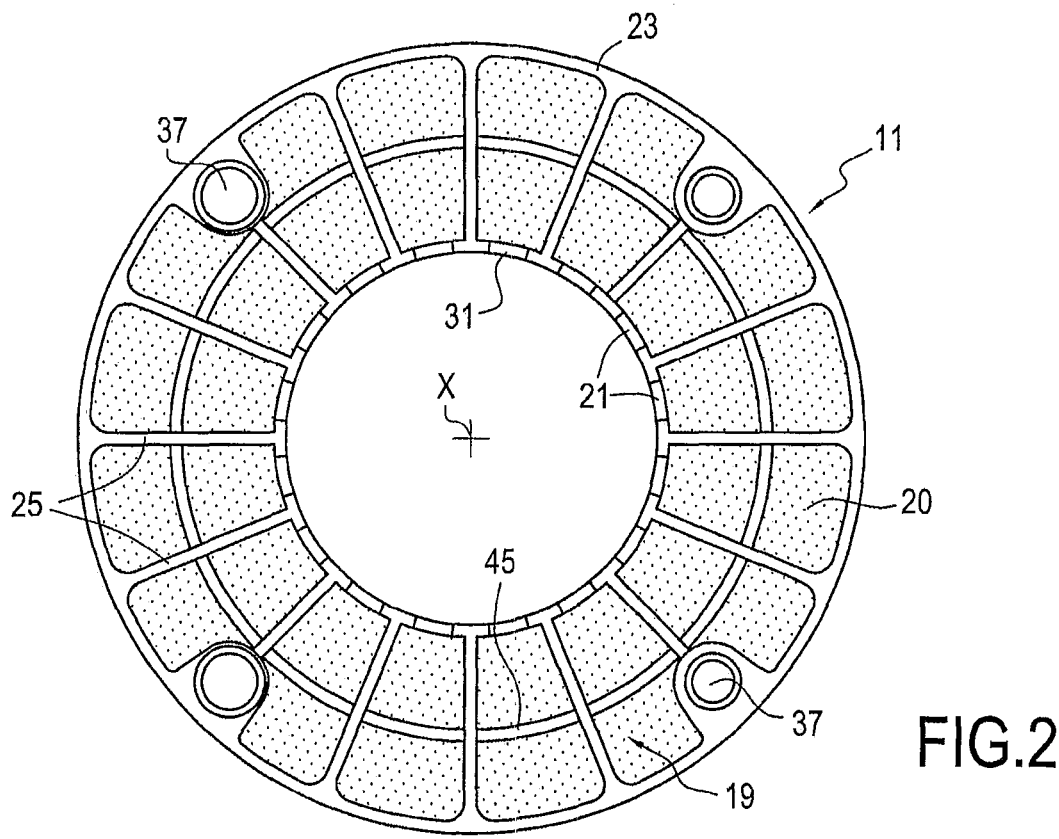
FIG. 2 is a plan view of the "external" face of the same filter element.
Figure 3B:
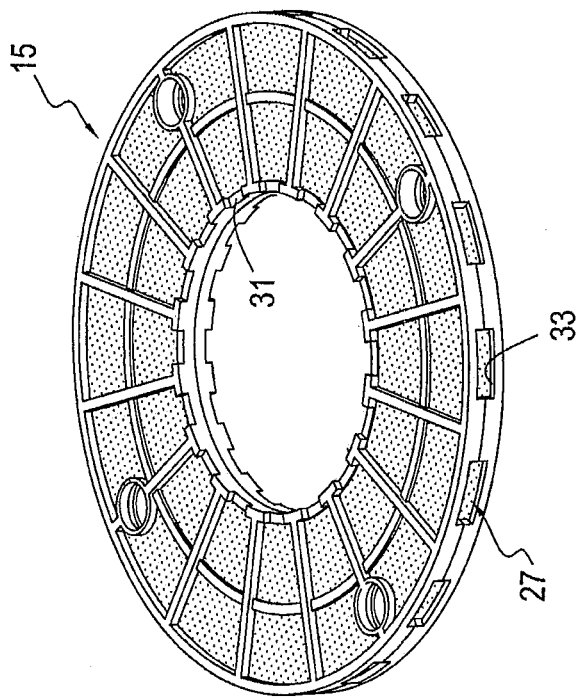
FIG. 3B is a perspective view showing the two filter elements once assembled together.
Figure 3A:
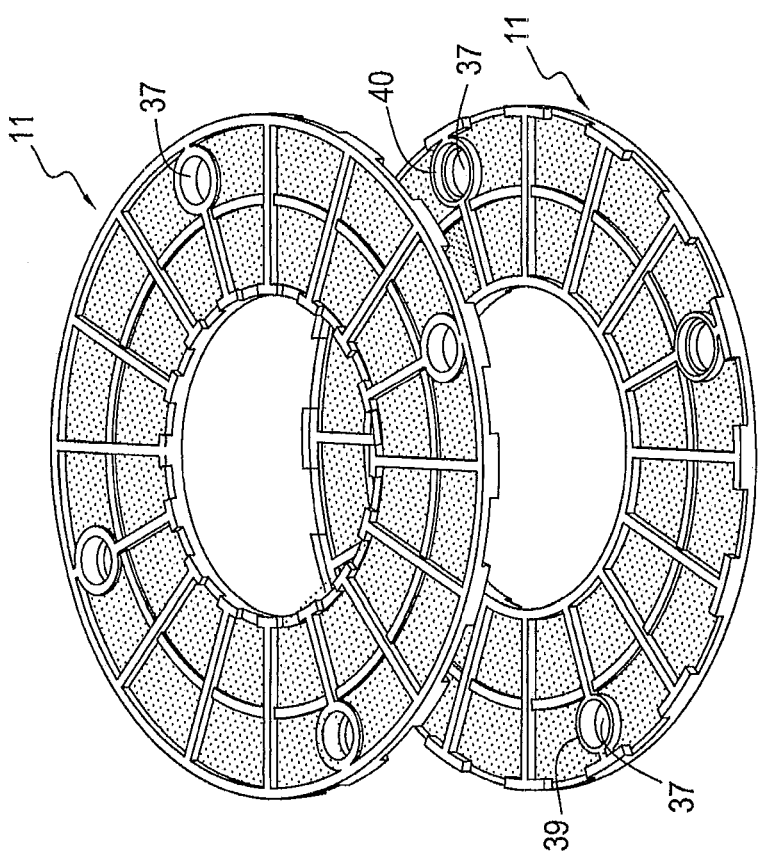
FIG. 3A is a perspective view showing two filter elements being assembled.

With reference more particularly to FIGS. 1 to 3, a filter element 11 used in making a filter 15 or 115 in accordance with the invention is generally in the form of a flat annulus of axis X. It has an "internal" face 17 and an "external" face 19, an annular screen 20, and two concentric circular margins, respectively an inner margin 21 and an outer margin 23 between which said screen extends. The two margins 21 and 23 extend on either side of the plane of the screen. The filter element also has radial ribs 25 that are regularly distributed circumferentially and that extend facing one another on opposite sides of the screen. The radial ribs 25 extend from one circular margin to the other so as to form sectors on said internal face and on said external face. The circular margins 21 and 23 have the same height in the axial direction as the pairs of radial ribs 25 that extend facing each other on either side of the screen 20. Consequently, when at least two filter elements 11 of this type are assembled together, one against the other so that their internal faces are facing each other, a space 27 is defined that is compartmented radially by the contacting radial ribs 25 of said internal faces. In the example described, the or each space 27 has the purified fluid passing therethrough, with the impurities being retained by the two screens 20 on their external faces.

As can be seen in the figures, the outer margin 23 of each filter element has respective passages 33 communicating with corresponding sectors of the internal faces, while the inner margin 21 of the same filter element has respective passages 31 communicating with corresponding sectors of the external faces. More particularly, these passages are in the form of notches cut out in said outer or inner margins, on one side or the other of the plane of the screen.

Holes 37 for passing assembly rods, typically threaded rods, are defined in the vicinity of the outer margin 23 of each filter element, and they are formed by molding the same material as defines the circular margins and the radial ribs.

Male and female bushings 39 and 40 are arranged around these holes for indexing two filter elements relative to each other.

In the non-limiting example shown, each filter element 11 is divided into sixteen sectors and has four holes with bushings regularly spaced apart circumferentially.

On each side of the screen, a circular rib 45 of thickness that is smaller than the thickness of the radial ribs extends between said inner and outer margins. This rib contributes to stiffening the filter element.

A filter 15 is made by assembling together at least two filter elements 11, as shown in FIG. 3B. To obtain a filter 115 (see FIG. 4) of desired filter capacity, it suffices to stack and assemble together a desired number of individual filters 15 like the filter shown in FIG. 3B.

The filter elements 11 are made by molding, including molding the annular screen in a midplane. The molded portion may be made of metal (e.g. an aluminum alloy), or of plastics material. The ribs and the margins may be coated in elastomer in order to avoid leaks between filter elements.

Figure 4:
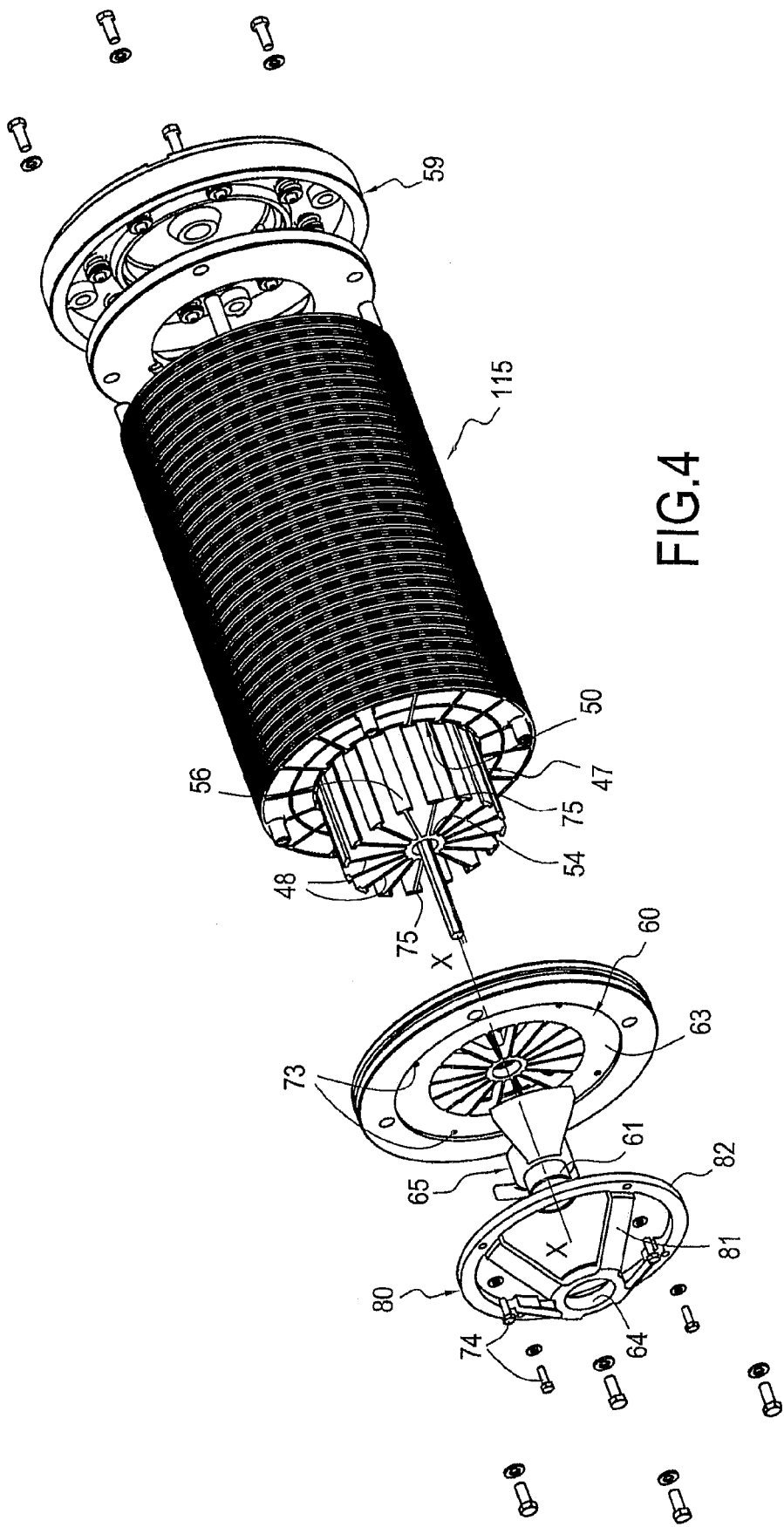
FIG. 4 is an exploded perspective view of the main portion of the filter.
Figure 5:
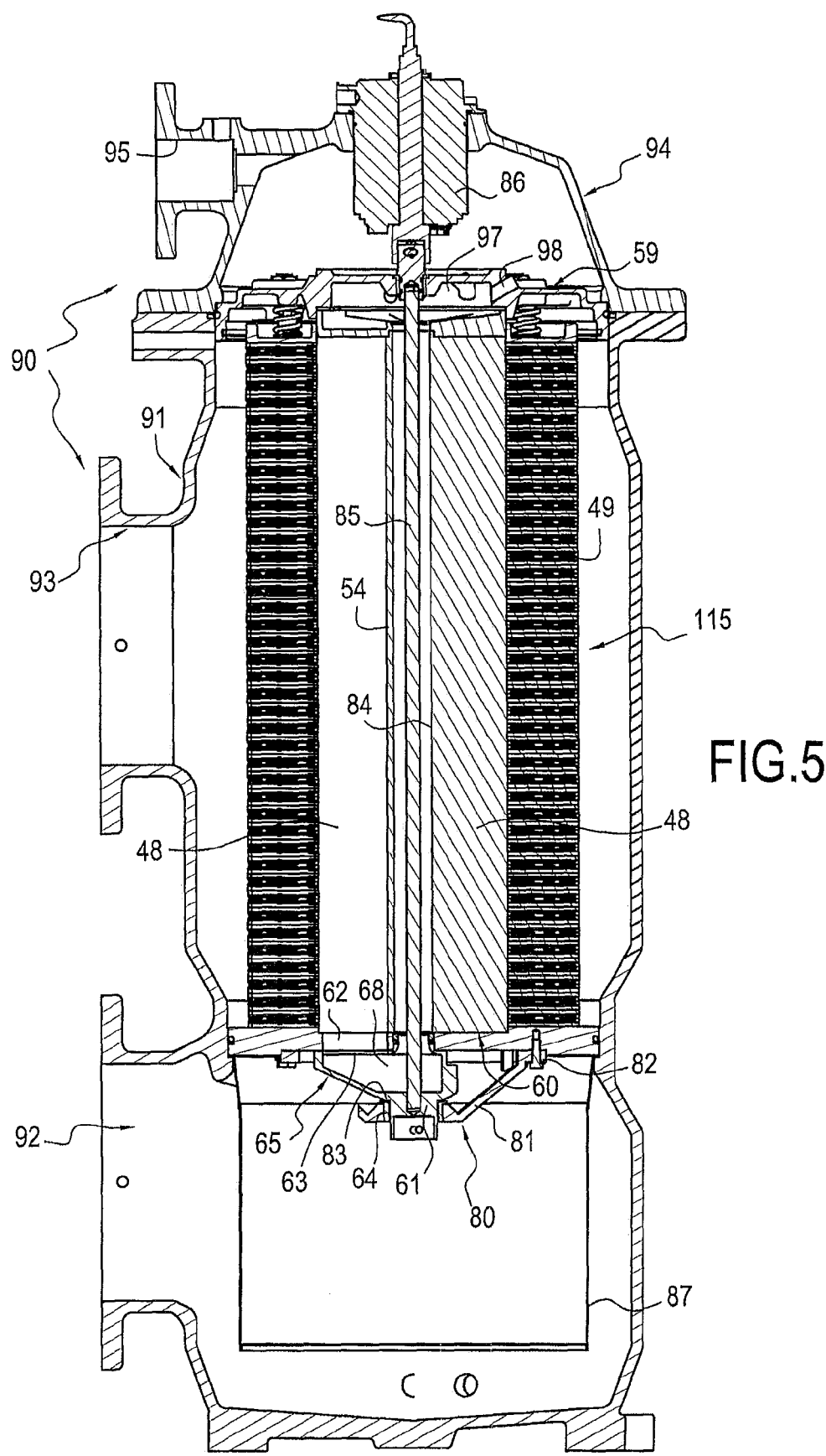
FIG. 5 is a section view of the complete filter.

As can be seen in FIGS. 4 and 5, the pairs of filter elements are stacked axially and clamped between a cover 59 and a distributor spacer 60. A stationary divider 47 has plane fins 48 that are regularly distributed circumferentially and that extend in planes containing the common longitudinal axis X of all of the filter elements (making up the filter proper) and is arranged coaxially with the stack 49, i.e., more particularly in this example, it is arranged inside the cylindrical space defined by the set of inner margins 31 of all of the filter elements. The divider co-operates with the stack 49 to define a set of sixteen distribution columns 50, i.e. the same number of columns as the number of sectors defined in the filter elements.

Each distribution column 50 is thus defined between two adjacent fins and a portion of the internal cylindrical surface of the stack.

More precisely, the fins 48 are attached to an axial cylindrical core 54 and the edges of the fins are in contact with the inner cylindrical surface of the stack 49 of filter elements.

Each distribution column communicates with the passages 31 of the inner margins of the external faces of the filter elements extending along a common direction parallel to the longitudinal axis X.

These passages constitute all of the inlets of the individual filters in the stack 49 that correspond to a given angular sector of the filter and that can be isolated in order to be subjected to a backwashing operation by reversing the flow direction of the filtered liquid.

Advantageously, the free edge of each fin 48 has a strip 56 extending longitudinally and presenting a cylindrical outer surface with a radius of curvature that is identical to the radius of curvature of the inner cylindrical surface of the stack 49. This strip presses against the stack, thereby improving sealing between the distribution columns 50.

The distribution spacer 60 has sector-shaped passages 62 extending said distribution columns 50. These passages open out to an outer surface 63 of the spacer. This surface has holes 73 for passing screws 74 that, on assembly, are positioned in register with tapped blind holes 75 arranged at the ends of some of the fins 48. In this way, the divider is fastened by screws to the internal face of the distribution spacer 60, thereby putting the inter-fin spaces and thus the distribution columns 50 into correspondence with the corresponding passages 62.

Furthermore, a rotary backwashing distributor 65 with an opening 66 is mounted to rotate against the outer face of the distribution spacer 60 so that said opening 66 is periodically put into communication with successive ones of said distribution columns 50.

The opening 66 is defined in a plane surface of the distributor that is in sliding contact with the corresponding plane surface 63 of the distribution spacer into which its passages open out. The rotary distributor 65 has an exhaust channel 68 connected to said opening.

The distributor 65 has a cylindrical shaft 61 engaged in a central cylindrical guide bearing 64 of a support 80 having arms 81 that extend between said bearing 64 and a ring 82 fastened to the periphery of the distribution spacer 60. The support 80 serves to center the distributor 65 relative to the filter. A spring (in the form of a corrugated washer) is interposed between the bearing and a shoulder of the distributor in order to press the distributor against the surface of the distribution spacer.

The cylindrical core 54 includes a channel on the axis X. The internal duct 84 that it defines in this way has an axial drive rod 85 passing therethrough to connect the shaft of a hydraulic motor 86 to the rotary backwash distributor 65. A strainer 87 for retaining the most bulky residues is fastened to the outside of the distribution spacer 60 and also houses the distributor 65.

The above-described subassembly is housed in a two-part casing 90 that is assembled together by flanges, comprising a body 91 having both an inlet 92 and an outlet 93 formed therein for the liquid that is to be processed, and a cap 94 in which there is formed an outlet 95 for the backwash liquid. The cap 94 also carries the hydraulic motor 86 axially, which motor is connected to one end of the drive rod 85. The cover 59 of the stack is made up of two portions that are assembled together coaxially and that define between them an annular chamber 97 in communication with the space inside the cap, via oblique holes 98, and with the internal duct 84 defined in the channel of the divider. The connection between the hydraulic motor and the rod passes through the cover 59 in sealed manner.

The distributor 65 is axially mounted to rotate at the corresponding end of the internal duct 84. The fluid for cleaning penetrates into the stack 49 via the passages 62 defined in the distribution spacer 60.

The liquid for cleaning is inserted via the inlet 92 of the body, passes through the strainer 87, and penetrates into the distribution columns 50 (between the fins) that are not isolated by the backwash distributor 65. The purified liquid is delivered to the outside of the stack and is removed by the outlet 93 of the body 91. At the same time, the backwash distributor 65 is driven to rotate slowly by the motor 86.

Figure 6:
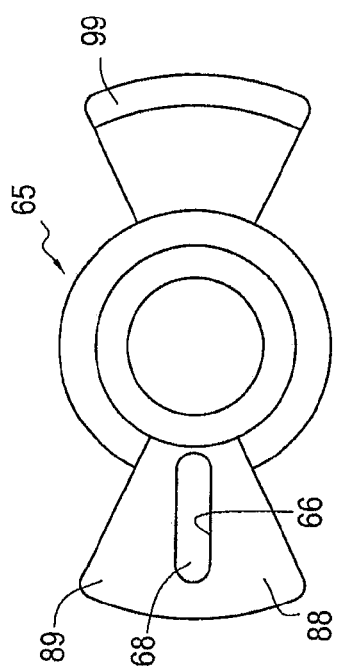
FIG. 6 is a view from beneath of the distributor.

As can be seen in FIG. 6, the opening 66 of the distributor that communicates with the passages 62 in the distribution spacer is situated between two shutter zones 88 and 89 of the plane surface that bears against the surface of the distribution spacer. In this example, the opening 66 has an outline in the form of a radial slot. The distributor also has a marginal bearing surface 99 that is diametrically opposite said plane surface but that bears on the spacer radially, but only outside the orifices of the passages 62. The exhaust channel 68 of the distributor is in permanent communication with the axial duct 84 of the divider.

Figure 9:
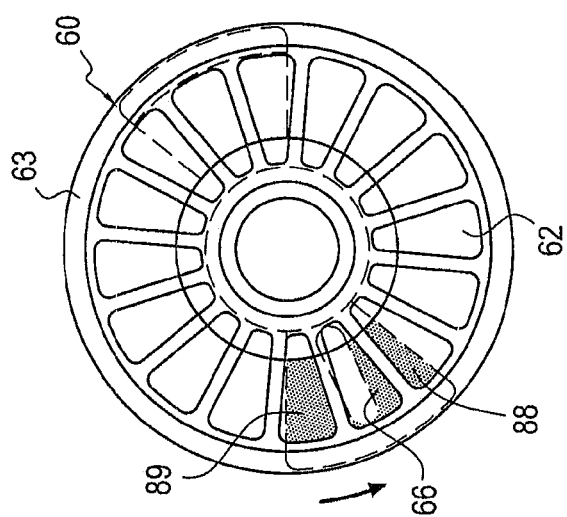
FIGS. 7 to 9 are diagrammatic views showing the automatic backwashing obtained by continuous rotation of the distributor.
Figure 8:
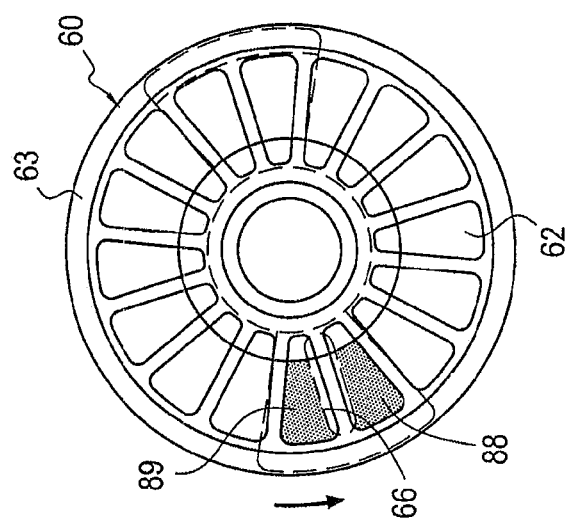
Figure 7:
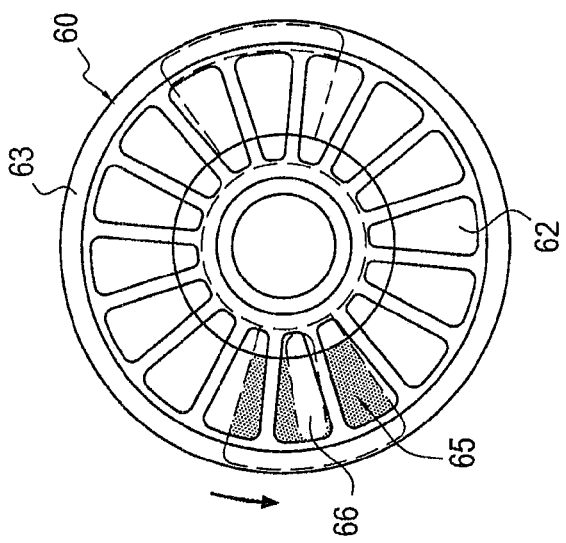

FIGS. 7 to 9 show how the distributor 65 is put into communication with the various sectors of the filter.

In the position of FIG. 7, only one sector is in communication with the opening 66. The adjacent sectors are isolated in part, but impure fluid continues to flow therein, whereas pure fluid flows as a backwash through the sector in communication with the distributor, thereby backwashing the corresponding screen fractions.

In FIG. 8, it can be seen that when the opening 66 passes from one sector to another, the two adjacent sectors are isolated by said shutter zones 88 and 89. In FIG. 9, the following sector is fully in communication with the distributor, and the preceding sector begins to be put back into communication with the fluid for cleaning, and the sector adjacent thereto which is being backwashed begins to be isolated. Thus, the configuration of the distributor prevents any mixing between the backwashing fluid and the filtered fluid.

Figure 10A:
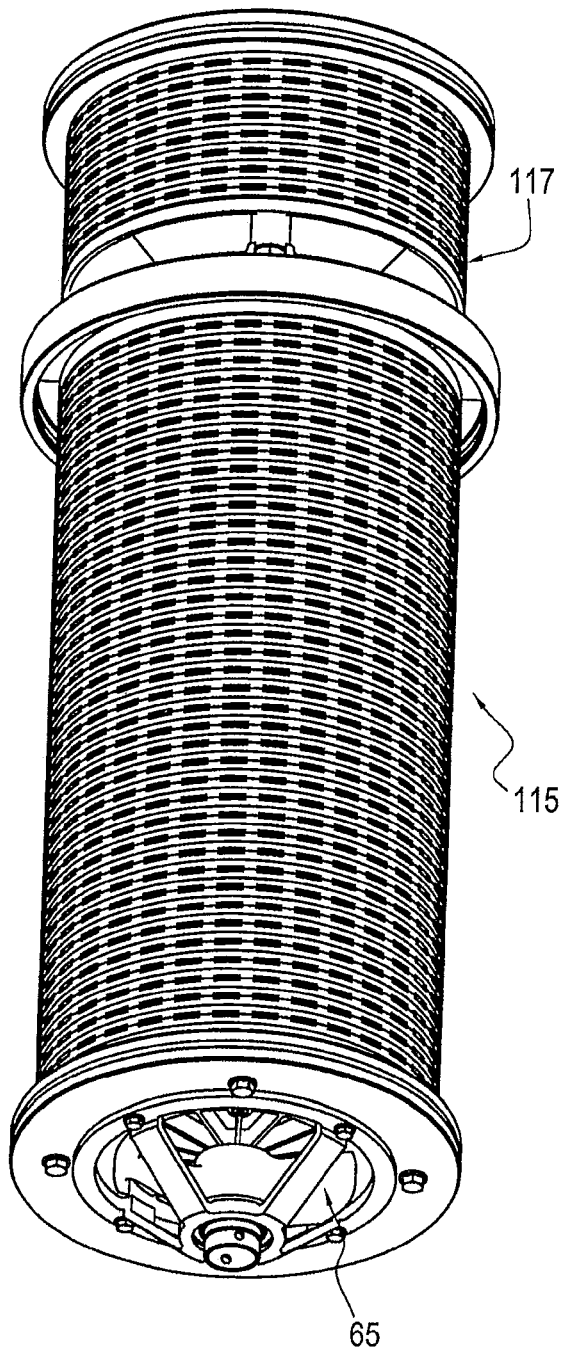
FIGS. 10A and 10B are outside perspective views of a variant.
Figure 10B:
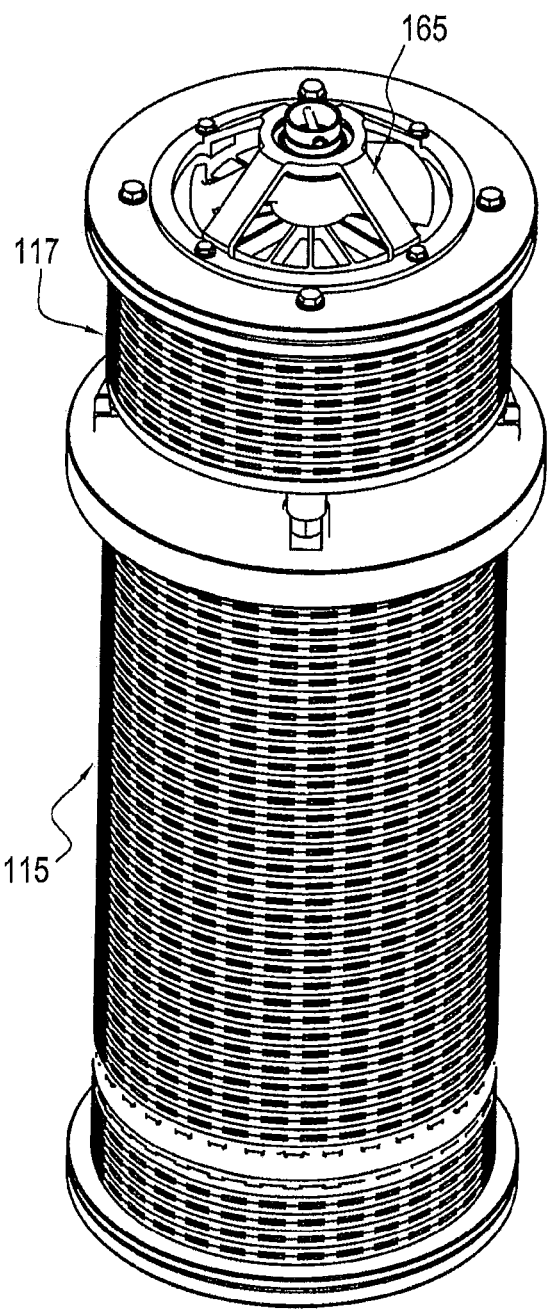

FIGS. 10A and 10B show an advantageous variant in which a main filter 115 as described above is extended by an auxiliary filter 117 of smaller capacity and arranged to receive the liquid that has been used for backwashing the sectors of the main filter. This auxiliary filter thus receives the impure liquid resulting from backwashing via the inside. Once this fluid has been filtered it flows to the outside of the auxiliary filter 117. The auxiliary filter may also be provided with an automatic backwashing system similar to that described above. Under such circumstances, the filter subassembly as shown has a rotary distributor 65, 165 at each end of a stack comprising the main filter 115 and the auxiliary filter 117. Both distributors are driven by the same axial rod connected to the shaft of the hydraulic motor.

Figure 11:
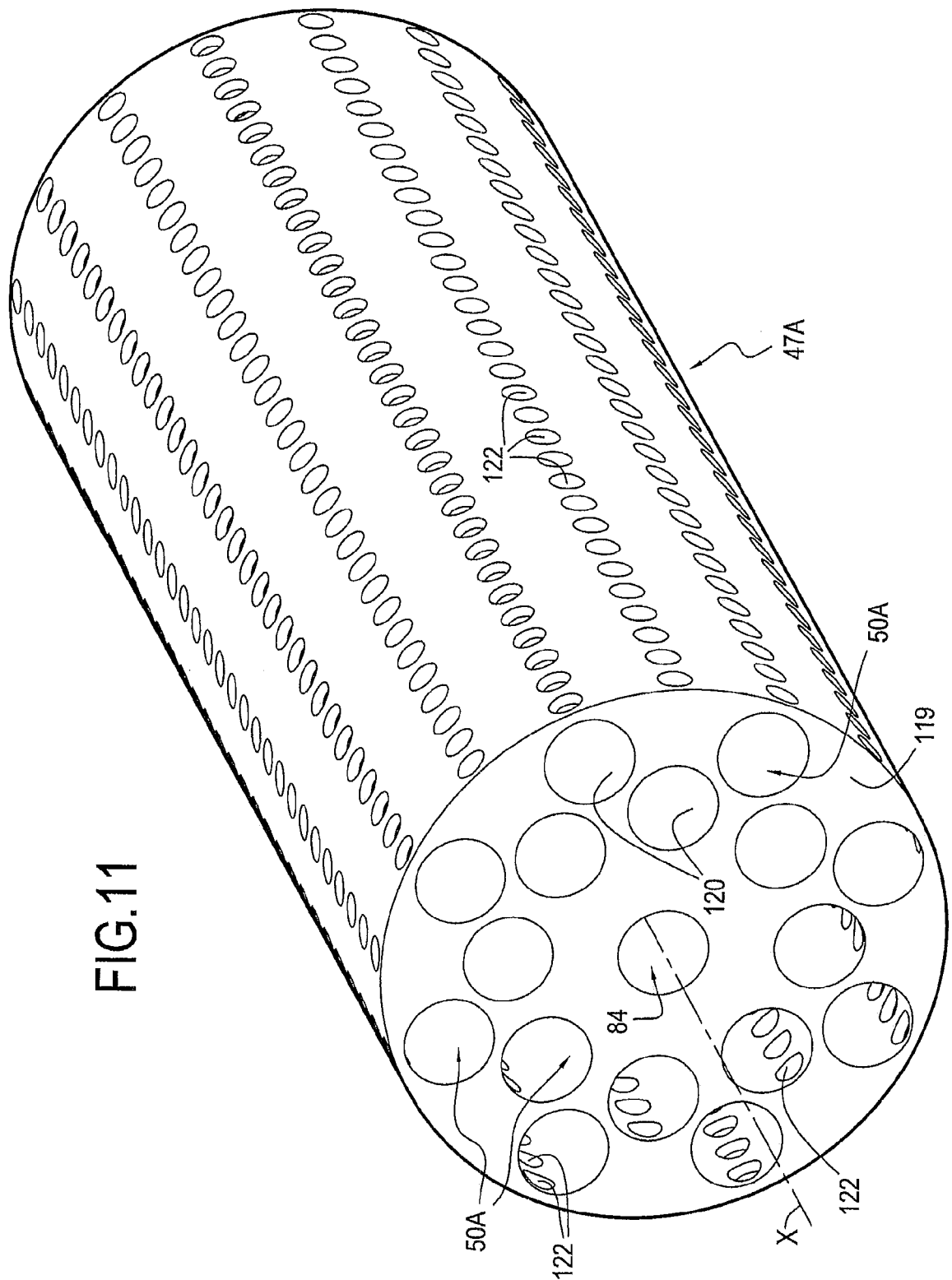
FIG. 11 shows a variant of the stationary distributor.

The divider may be of a shape other than that shown in FIG. 4, providing it ensures communication between said rotary distributor and the passages defined in the surface of the stack of filter elements. More precisely, the divider needs to be provided with distinct ducts each establishing communication between one of the passages (of appropriate shape) of a distribution spacer and a group of passages of said stack of filter elements in alignment along a generator line. The number of groups corresponds to the number of sectors defined in the superposed filter elements. For example, with reference to the embodiment shown in FIG. 11, it can be seen that the stationary divider 47A is defined in a cylinder 119 of diameter equal to the diameter of the inner cylindrical surface of the stack 49. Each distribution column 50A comprises a duct 120 parallel to the axis and a row of holes 122 extending radially from the outer surface of the cylinder 119 and opening out into the duct 120. Each hole in a row faces a passage 31 defined in the inner surface of the stack of filter elements and corresponding to the same angular sector of the filter.

The invention claimed is:

1. A filter comprising:
at least one pair of flat filter elements, each filter element having an internal face, an external face, a screen, two concentric circular margins, respectively an inner margin and an outer margin between which said screen extends, and radial ribs regularly distributed circumferentially and extending facing one another on either side of said screen and between said concentric margins in order to form sectors on said internal face and on said external face, said at least one pair of filter elements being assembled one against the other so that said facing internal faces define a space that is radially compartmented by the contacting radial ribs of said internal faces, said outer and inner margins having respective passages communicating with corresponding ones of the sectors;
parallel distribution columns extending along an axial direction, said parallel distribution columns being separate elements from said at least one pair of filter elements; and
a rotary backwashing distributor having an opening, said rotary backwashing distributor being mounted to rotate so that said opening is periodically and selectively put into communication with each distribution column,
wherein said parallel distribution columns are embodied by a separate stationary divider arranged coaxially with a stack of said at least one pair of filter elements of said filter, the separate stationary divider having distinct ducts respectively establishing communication between said rotary backwashing distributor and respective passages of the inner margins of the at least one pair of filter elements.

2. The filter according to claim 1, wherein said ducts are embodied by fins that are regularly distributed circumferentially and that extend in planes containing a longitudinal axis of said filter.

3. The filter according to claim 2, wherein said separate stationary divider is constituted by said fins attached to an axial cylindrical core, edges of said fins being in contact with an inner cylindrical surface of said stack of at least one pair of filter elements in such a manner that each distribution column is defined by two adjacent fins and by the inner cylindrical surface of the stack.

4. The filter according to claim 3, wherein each free edge of a fin includes a strip extending longitudinally and presenting a cylindrical outer surface having a radius of curvature identical to the radius of curvature of the inner cylindrical surface of said stack, and against which the cylindrical outer surface of the strip bears.

5. The filter according to claim 1, wherein said at least one pair of filter elements is clamped between a cover and a distribution spacer, said distribution spacer has passages extending to said distribution columns and opening out into a surface thereof, and said rotary backwashing distributor has an exhaust channel connected to said opening of the rotary backwashing distributor, said opening being defined in a surface of said rotary backwashing distributor that is in sliding contact with said distribution spacer, said exhaust channel being in communication with a source of backwashed liquid.

6. The filter according to claim 5, wherein said opening is situated between two shutter zones of said surface of said rotary backwashing distributor.

7. A filter device comprising:
a main filter, said main filter being the filter according to claim 1; and
an auxiliary filter arranged to receive the liquid that has been used for backwashing said main filter.

8. The filter device according to claim 7, wherein said auxiliary filter includes another rotary backwashing distributor similar to the rotary backwashing distributor of said main filter.

9. The filter device according to claim 8, wherein the two rotary backwashing distributors are installed respectively at two ends of a stack comprising said main filter and said auxiliary filter.

10. The filter according to claim 1, wherein said separate stationary divider extends axially an entire length of the at least one pair of flat filter elements.

11. The filter according to claim 1, wherein the inner margin forms a surface that extends around an entire inner perimeter of the filter element.

12. The filter according to claim 10, wherein said ducts are formed by fins extending radially from a longitudinal axis of said separate stationary divider, and wherein said surface of the inner margin of the at least one pair of filter elements is in surface contact with an outer perimeter surface of the fins of the separate stationary divider.

13. A filter, comprising:
at least one pair of flat filter elements, each filter element having an internal face, an external face, a screen, two concentric circular margins, respectively an inner margin and an outer margin between which said screen extends, and radial ribs regularly distributed circumferentially and extending facing one another on either side of said screen and between said concentric margins in order to form sectors on said internal face and on said external face, said at least one pair of filter elements being assembled one against the other so that said facing internal faces define a space that is radially compartmented by the contacting radial ribs of said internal faces, said outer and inner margins having respective passages communicating with corresponding ones of the sectors;
parallel distribution columns extending along an axial direction; and
a rotary backwashing distributor having an opening, said rotary backwashing distributor being mounted to rotate so that said opening is periodically and selectively put into communication with each distribution column,
wherein said parallel distribution columns are embodied by a stationary divider arranged coaxially with a stack of said at least one pair of filter elements of said filter, the stationary divider having distinct ducts respectively establishing communication between said rotary backwashing distributor and respective passages of the inner margins of the at least one pair of filter elements,
wherein said ducts are embodied by fins that are regularly distributed circumferentially and that extend in planes containing a longitudinal axis of said filter,
wherein said stationary divider is constituted by said fins attached to an axial cylindrical core, edges of said fins being in contact with an inner cylindrical surface of said stack of at least one pair of filter elements in such a manner that each distribution column is defined by two adjacent fins and by the inner cylindrical surface of the stack, and
wherein each free edge of a fin includes a strip extending longitudinally and presenting a cylindrical outer surface having a radius of curvature identical to the radius of curvature of the inner cylindrical surface of said stack, and against which the cylindrical outer surface of the strip bears.

\* \* \* \* \*